United States Patent
Van Ingen et al.

(10) Patent No.: US 7,756,833 B2
(45) Date of Patent: Jul. 13, 2010

(54) METHOD AND SYSTEM FOR SYNTHETIC BACKUP AND RESTORE

(75) Inventors: Catharine Van Ingen, Bellevue, WA (US); Brian T. Berkowitz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 10/948,009

(22) Filed: Sep. 22, 2004

(65) Prior Publication Data

US 2006/0064444 A1 Mar. 23, 2006

(51) Int. Cl.
*G06F 17/30* (2006.01)

(52) U.S. Cl. ............... 707/640; 707/641; 707/661; 707/682; 714/15; 714/20

(58) Field of Classification Search ............... None
See application file for complete search history.

(56) References Cited

U.S. PATENT DOCUMENTS

| | | | | |
|---|---|---|---|---|
| 4,959,774 A | * | 9/1990 | Davis | 714/6 |
| 5,664,186 A | * | 9/1997 | Bennett et al. | 1/1 |
| 6,038,379 A | * | 3/2000 | Fletcher et al. | 709/230 |
| 6,141,773 A | * | 10/2000 | St. Pierre et al. | 714/20 |
| 6,959,368 B1 | * | 10/2005 | St. Pierre et al. | 711/162 |
| 7,103,740 B1 | * | 9/2006 | Colgrove et al. | 711/162 |
| 7,146,476 B2 | * | 12/2006 | Sandorfi et al. | 711/162 |
| 2002/0059505 A1 | * | 5/2002 | St. Pierre et al. | 711/162 |
| 2002/0147733 A1 | * | 10/2002 | Gold et al. | 707/200 |
| 2002/0194523 A1 | * | 12/2002 | Ulrich et al. | 714/4 |
| 2003/0149736 A1 | * | 8/2003 | Berkowitz et al. | 709/213 |
| 2004/0267838 A1 | * | 12/2004 | Curran et al. | 707/204 |
| 2005/0027956 A1 | * | 2/2005 | Tormasov et al. | 711/162 |
| 2005/0188165 A1 | * | 8/2005 | Wolfgang et al. | 711/162 |
| 2006/0053259 A1 | * | 3/2006 | Berkowitz et al. | 711/162 |

* cited by examiner

*Primary Examiner*—Don Wong
*Assistant Examiner*—Shyue Jiunn Hwa
(74) *Attorney, Agent, or Firm*—Workman Nydegger

(57) ABSTRACT

A method and system for backing up and restoring data. First, a full backup is performed to create a full dataset. Thereafter, incremental or differential datasets may be created by incremental or differential backups, respectively. When a new full dataset is needed, instead of performing a full backup, a previous full dataset may be combined with subsequent incremental or differential datasets to create the new full dataset. The new full dataset may be created on a computer other than the computer which hosts the data of the previous full dataset. The new full dataset may be used for offsite storage or to quickly restore data in the event of a failure or corruption of a computer's file system.

24 Claims, 7 Drawing Sheets

METHOD AND SYSTEM FOR SYNTHETIC BACKUP AND RESTORE

FIELD OF THE INVENTION

The invention relates generally to computers, and more particularly to backups and restores of data.

BACKGROUND

Performing full backups of data on a computer is a very costly management task. Typically, it involves enumerating all files on the file system of the computer and backing up each of those files individually. Because of the random nature in which these files are spread over the file system and the significant overhead imposed by extracting metadata associated with the files, enumerating over all the files in performing a backup tends to be very slow. Despite the expense, most organizations perform a full backup on a weekly basis, both to limit the time that it takes to recover from a disaster and because of the need to store datasets created by these backups offsite in case of data center loss (e.g., fires, flooding, and earthquakes).

Incremental or differential backups may be performed between full backups to capture the changes that happen between the full backups. The datasets created by both incremental and differential backups may consume considerable resources in storing the differences between the file system at the time of the full backup and the time of the differential backup. With incremental backups, restoring the files on a computer after a disaster may consume substantially more time as the dataset created by the full backup may need to be restored and then datasets created by one or more incremental backups applied.

What is needed is a method and system that quickly and efficiently allows a file system to be fully backed up without severely impacting the performance of a computer. Ideally, such a method and system would also provide an efficient mechanism for restoring files to the computer in the case of partial or complete failure of the computer's file system.

SUMMARY

Briefly, the present invention provides a method and system for backing up and restoring data. First, a full backup is performed to create a full dataset. Thereafter, incremental or differential datasets may be created by incremental or differential backups, respectively. When a new full dataset is needed, instead of performing a full backup, a previous full dataset may be combined with subsequent incremental or differential datasets to create the new full dataset. The new full dataset may be created on a computer other than the computer which hosts the data of the previous full dataset. The new full dataset may be used for offsite storage or to quickly restore data in the event of a failure or corruption of a computer's file system.

In one aspect of the invention, datasets are stored in online storage such as a hard disk.

In another aspect of the invention, a physical backup is performed which allows shadow copies included on a volume to also be backed up.

In another aspect of the invention, datasets may be created using differential compression to allow multiple datasets to be efficiently stored in online storage.

In another aspect of the invention, a file system filter tracks which blocks or extents of certain files (e.g., large files) in a file system have changed. Upon backup, rather than copying each large file, only the blocks or extents that have changed are copied.

In another aspect of the invention, data from a dataset may be read directly from the dataset by an application to allow access to the data prior to or without restoring the dataset.

Other advantages will become apparent from the following detailed description when taken in conjunction with the drawings, in which:

DETAILED DESCRIPTION

Exemplary Operating Environment

Figure 1:
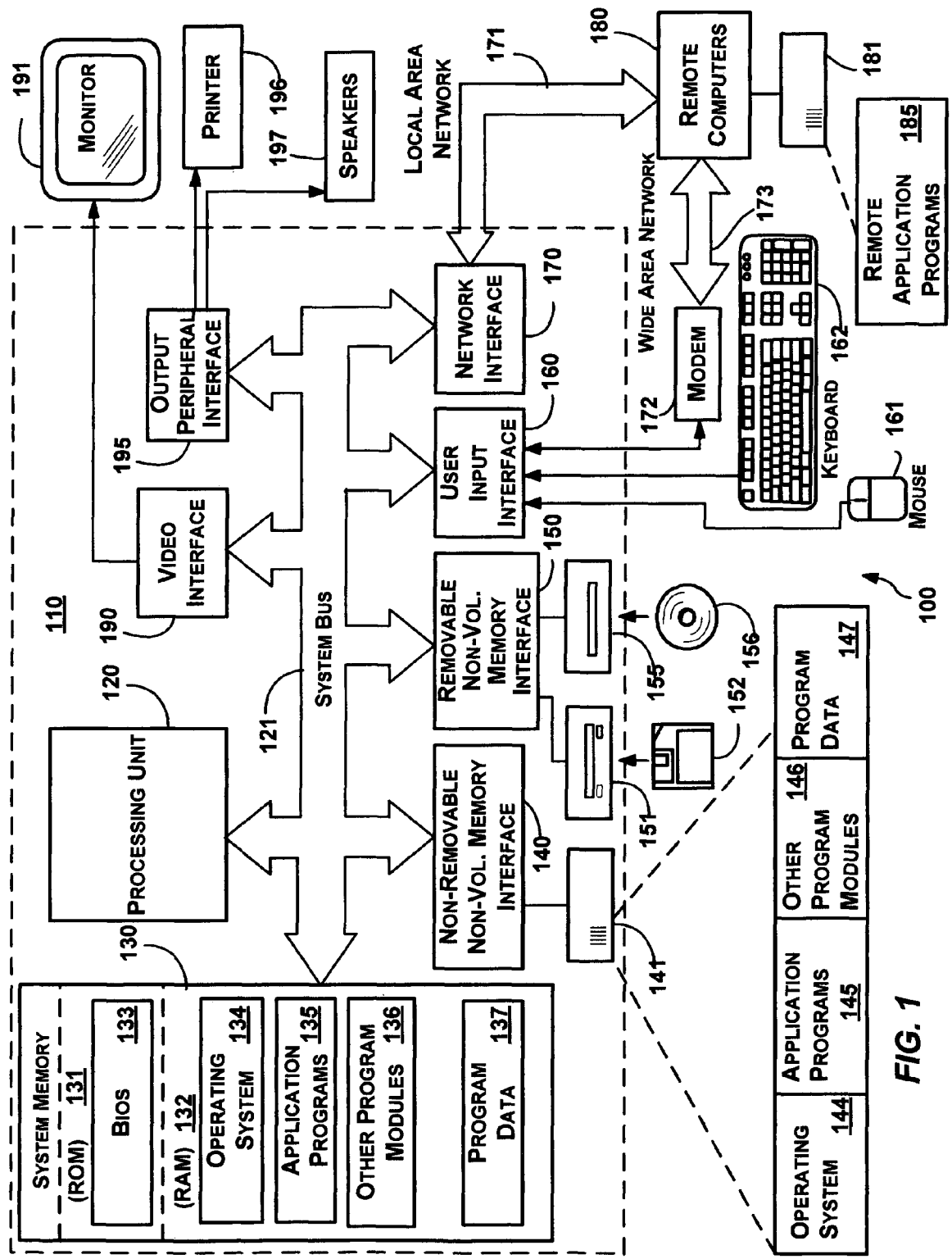
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Synthetic Full Backups

Instead of performing full backups on a periodic basis, a full backup may be performed once with incremental or differential backups performed thereafter. Whenever a new full dataset is needed (e.g., on a weekly basis for off-site storage or otherwise), a synthetic full backup may be performed using the last full dataset and either the last differential dataset or all the incremental datasets created after the last full dataset. A synthetic full backup creates a dataset that is equivalent to what a normal full backup would have created if executed at the create time of the last dataset used by the synthetic full backup. Hereafter, the term full backup may refer to a normal full backup and/or to a synthetic full backup.

The term full dataset refers to a representation of data of a data source at a point in time. A data source may include a volume (e.g., for file-oriented data), a database (e.g., for data stored in a complex store), or some combination thereof. A full dataset may be created by performing a normal full backup, a synthetic full backup, or a physical full backup.

A differential dataset is created by a differential backup and includes the differences between a data source at the time of the last full backup and the data source at the time the differential backup is performed. An incremental dataset is created by an incremental backup and includes the differences between a data source at the time of the last backup (full, differential, or incremental) and the data source at the time the incremental backup is performed.

An algorithm for doing a merge of the datasets created by a full backup and a differential backup in a synthetic full backup is described below. This algorithm assumes that each dataset is formatted in Microsoft® Tape Format (MTF) although the methodology applies to datasets formatted in any format where there is an existing or creatable catalog enumerating the contents of the datasets or at least the deltas from the previous full, differential, or incremental dataset.

In each dataset created in MTF format by a full, incremental, or differential backup, an entry for each file or directory on the volume appears in a header of the dataset. Hereafter, the term "object" is sometimes used to refer to a file or directory or both. For a full dataset created in MTF format by a full backup, the metadata and data for all files and directories on the volume appear in the full dataset. For datasets created in MTF format by differential or incremental backups, the metadata and data for an entry may only appear in the dataset created by the differential or incremental backup if the object has been newly created or changed from the previous dataset on which the differential or incremental dataset is based. MTF orders objects within a dataset in a well-defined order and ensures that if an object F appears in the dataset, then all of the object's ancestor directories (parent, grandparent, etc.) up to the root of the volume have also previously appeared within the dataset.

As used herein, data associated with an object includes the content associated with the object while metadata associated with an object includes any attributes or other data associated with the object.

Figure 2:
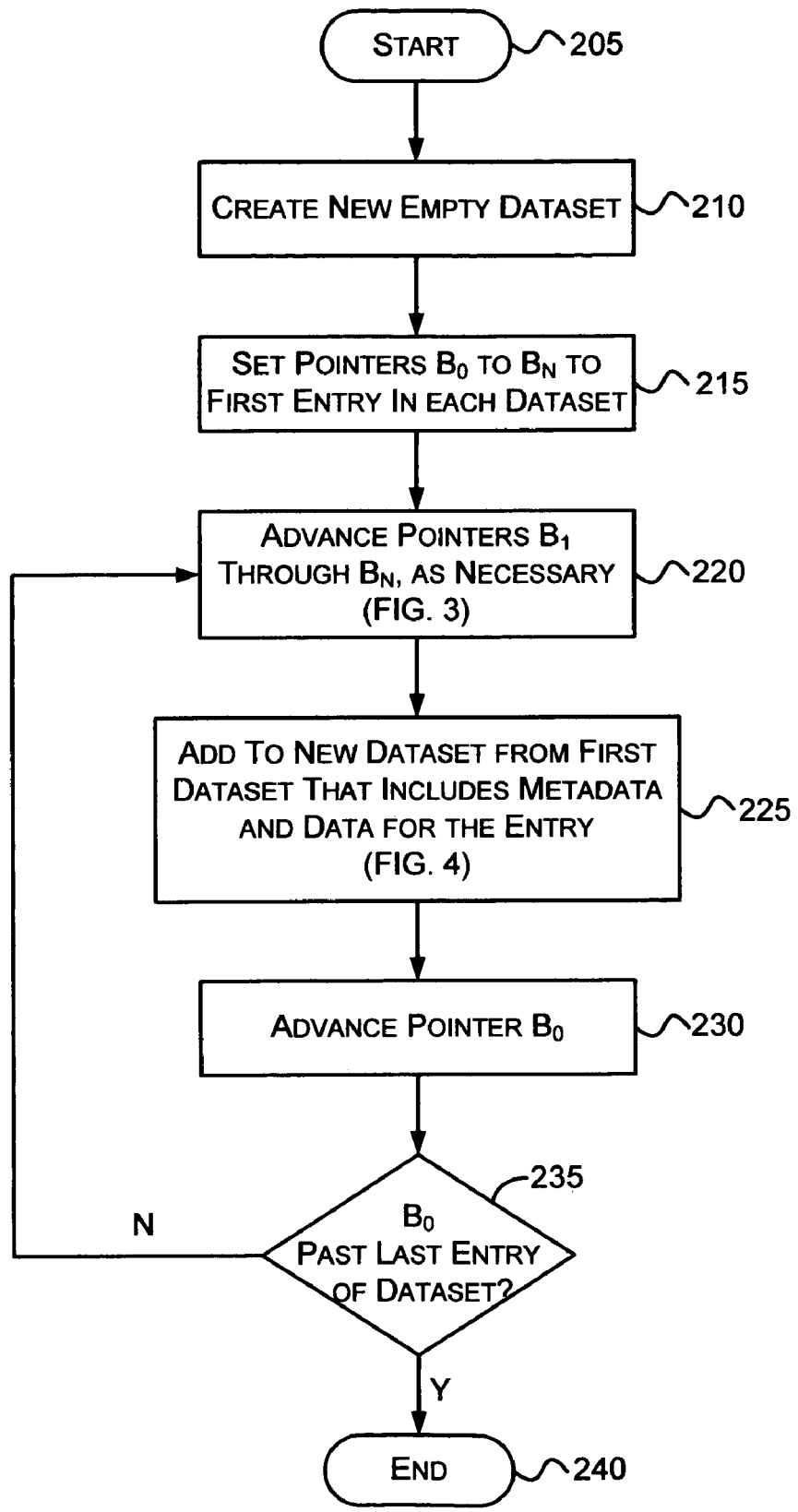
FIGS. 2-4 are flow diagrams that generally represent actions that may occur to perform a synthetic full backup in accordance with various aspects of the invention.
Figure 3:
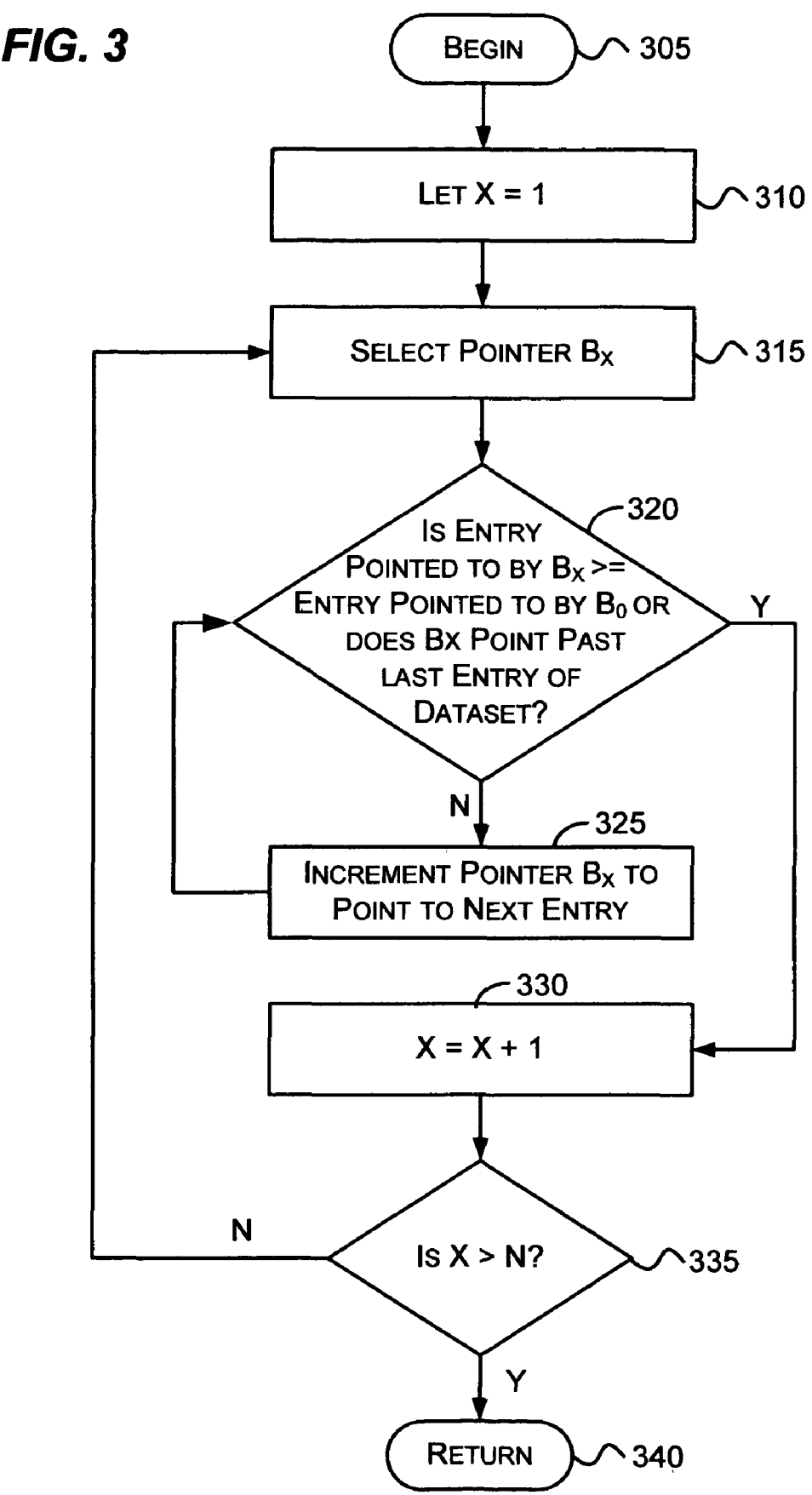
Figure 4:
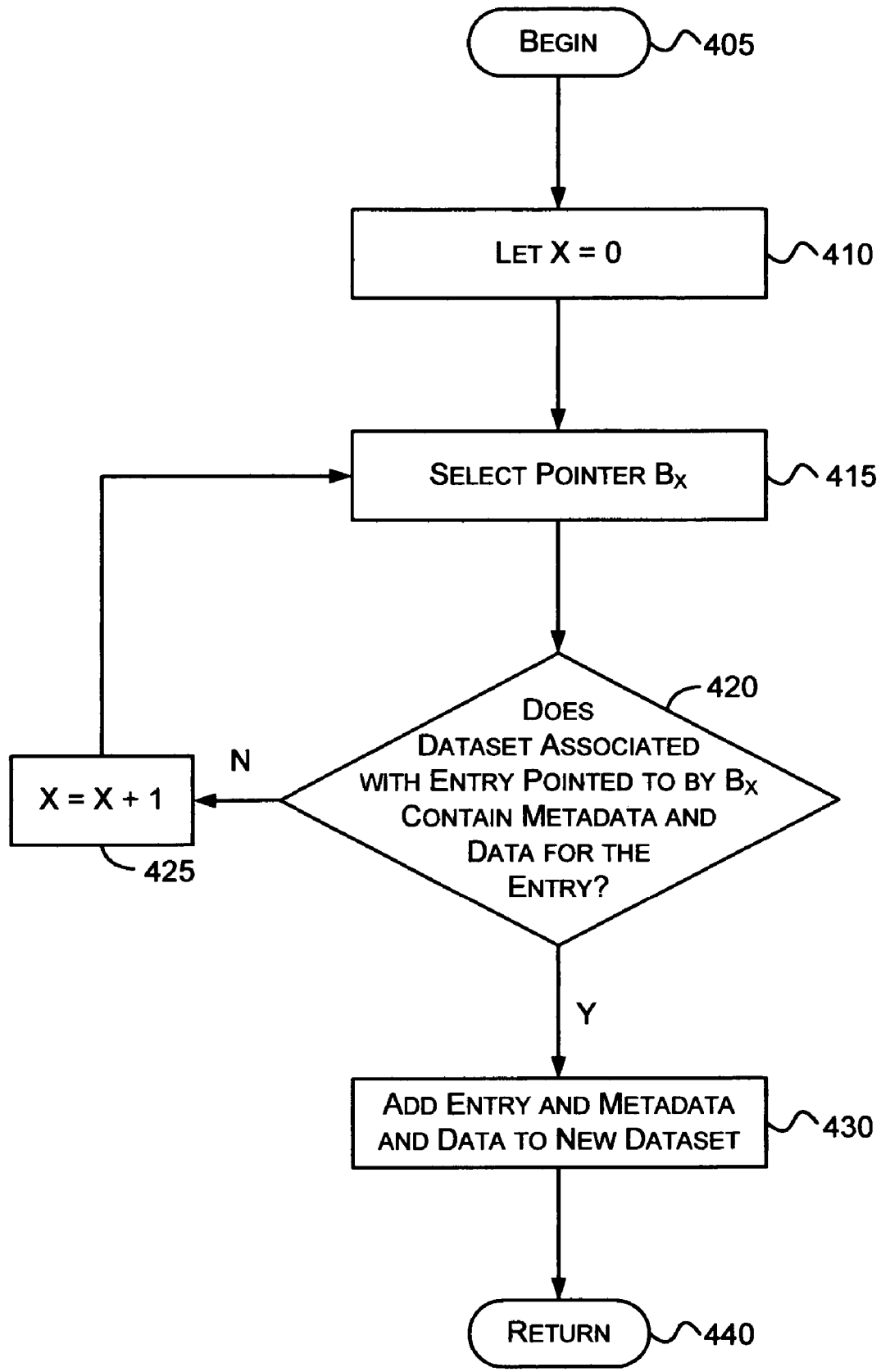

FIGS. 2-4 are flow diagrams that generally represent actions that may occur to perform a full synthetic backup in accordance with various aspects of the invention. Referring to FIG. 2, at block 205, the process begins. At block 210, a new empty dataset is created. At block 215, pointers are set to the first entry in each of the datasets that is involved in the merge. Let $B_0$ be a pointer to the most recent differential or incremental dataset, $B_1$ to $B_{N-1}$ be pointers to differential or incremental datasets that are ordered in time and immediately less recent than the dataset pointed to by $B_0$, and $B_N$ be a pointer that points to the last full dataset. The algorithm proceeds as follows:

At block 215, the pointer associated with each dataset is assigned to the first entry associated with the dataset. At block 220, each pointer is advanced, if necessary, until the entry associated with the pointer is either equal to or greater than the entry pointed to by $B_0$ as described in more detail in conjunction with FIG. 3. A pointer may not need to be advanced if the entry it points to is already greater than or equal to the entry pointed to by $B_0$ or if the pointer has passed the last entry of its associated dataset.

At block 225, information from the first dataset that includes metadata and data is added to the new dataset as described in more detail in conjunction with FIG. 4. At block 230, the pointer $B_0$ is advanced to examine the next entry found in the dataset. At block 235, if $B_0$ indicates that the end of its dataset has been reached, processing ends at block 240; otherwise, processing branches to block 220.

FIG. 3 is a flow diagram that generally represents actions which correspond to block 220 of FIG. 2 that may occur to advance pointers that point to datasets in accordance with various aspects of the invention. The pointers that point to each dataset (not including the pointer associated with $B_0$) are advanced, if necessary, until they are greater than or equal to the entry pointed to by $B_0$. The process is entered at block 305. At block 310, an index (e.g., X) is assigned to 1 in preparation for selecting pointer $B_1$. At block 315, the pointer $B_X$ is selected to examine the entry pointed to by the pointer $B_X$. At block 320, a determination is made as to whether the entry in the dataset pointed to by $B_X$ is greater than or equal to the entry in the dataset pointed to by $B_0$ or whether $B_X$ points past the end of the dataset associated with $B_X$. If so, processing branches to block 330, where the index is incremented to obtain the next pointer. Otherwise, processing branches to block 325, where the pointer $B_X$ is incremented to point to the next entry of its associated dataset. The loop associated with blocks 320 and 325 continues until the entry pointed to by $B_X$ is greater than or equal to the entry pointed to by $B_0$ or until $B_X$ points past the end of the dataset associated with $B_X$.

At block 335, a determination is made as to whether the index (e.g., X) is greater than the number of pointers (e.g., N). If so, all the pointers have been examined and advanced, if necessary, and processing branches to block 340 where the process returns to the calling process. If not, processing branches to block 315 where the next pointer is selected.

FIG. 4 is a flow diagram that generally represents actions that correspond to block 225 of FIG. 2 that may occur to find the most recent dataset entry to insert into the new dataset in accordance with various aspects of the invention. The process is entered at block 405. At block 410, an index (e.g., X) is set to zero in preparation for selecting the pointer to the dataset created by the most recent backup. At block 415, the pointer $B_X$ is selected to examine the entry pointed to by the pointer. At block 420, a determination is made as to whether the entry pointed to by pointer $B_X$ contains metadata and data for the entry. If the entry pointed to by $B_X$ contains metadata and data, then processing branches to block 430, where the entry and metadata and data are added to the new dataset. Otherwise, processing branches to block 425 where the index (e.g., X) is incremented at block 425 and the next pointer is selected at block 415. The actions represented by blocks 415-425 repeat until the most recent dataset with an entry containing the data and metadata is found.

Note that under MTF if a dataset contains an entry for an object but no metadata or data, this means that each previous dataset contains such an entry for this object until some dataset also contains the data and metadata for the object.

The algorithm described above may be used to:

merge a full dataset with the most recent differential dataset that is based on that full dataset;

merge a full dataset with every incremental dataset that was created after the full dataset (e.g., for use if only incremental backups are performed); or merge a full dataset with the most recent differential dataset that is based on that full dataset and every incremental dataset that is based on that differential dataset (e.g., for use if both differential and incremental backups are performed).

As noted above, the algorithm described above has been described based on MTF format. It will be recognized, however, that without departing from the spirit or scope of the present invention, this algorithm may be readily modified to account for other formats as long as each incremental or differential dataset includes a way of determining what objects were deleted from the previous dataset and what objects were modified or added to the previous dataset.

While the algorithm described above may be used to merge datasets which are either on disk or on tape, in practice, it may be most efficient when all of the incremental/differential datasets and the full dataset that are being merged are on disk.

Furthermore, the algorithm described above may be generalized to a multi-pass merge, but overheads associated with multiple passes may make the algorithm less interesting in practice. Since tape is a sequential media, having all datasets open simultaneously may use a moderately large number of tape drives (e.g., one drive per dataset) and may work best with no collocation of the datasets (i.e., one and only one merging dataset per media).

Finally, to offload merge processing from a production computer, a separate backup computer may be used to perform the merge processing. It will be recognized that this has many advantages including freeing the production computer for production purposes.

Physical Backups and Restores

One problem with existing technology for performing full backups is that there is no association between the logical objects that are backed up and the physical representation of those objects on disk. This problem may be overcome through the use of a shadow copy. A shadow copy is a "snapshot" of one volume. Logically, a shadow copy is an exact duplicate of a volume at a given point in time, even though the volume may not be entirely copied (e.g., via copy-on-write) in creating the shadow copy. A shadow copy may be viewed as a separate volume by the operating system and any executing applications. For example, a shadow copy may have a volume device, a volume name, a drive letter, a mount point, and any other attribute of an actual volume. In addition, a shadow copy may be exposed through a network remote path such as a network share (sometimes referred to simply as a "share") associated with it that allows access to a portion or all of the data contained within the shadow copy from a network.

A shadow copy may be created by various well-known techniques, including copy-on-write, split mirror, specialized hardware that creates a copy of the disk itself, and other methods and systems known to those skilled in the art.

Shadow copy technology may use a differential area to implement copy-on-write shadow copies. The differential area maps blocks on the volume to the contents of those blocks at the point in time that the shadow copy was created. The difference technology of the shadow copy technology may operate on the physical block level instead of at the object (file or directory) level.

Figure 5:
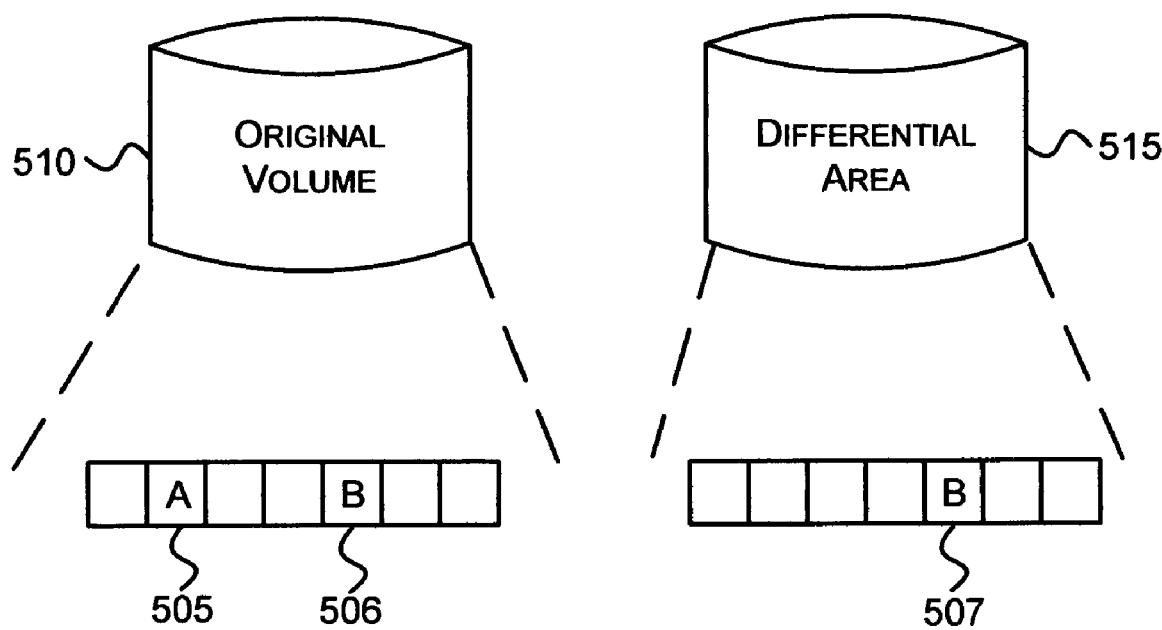
FIG. 5 is a block diagram of aspects of a shadow copy mechanism that uses copy-on-write in accordance with various aspects of the invention.

For example, referring to FIG. 5, in copy-on-write, a driver may divide a disk into extents. An extent refers to a number of contiguous blocks on a storage media and may differ depending on application. For example one application may divide a disk into extents having one size, while another application may divide the disk into extents having a different size.

If a block on the disk changes after creation of the shadow copy, before the block is changed, the extent containing the block (e.g., extent 506) is copied to a storage location (e.g., extent 507) in a differential area 515. For a particular shadow copy, an extent is only copied the first time any block within the extent changes. When a request for information in the shadow copy is received, first, a check is performed to determine if the block has changed in the original volume (e.g., by checking whether an extent containing that block exists in the differential area 515). If the block has not changed, data from the original volume is retrieved and returned. If the block has changed, data from the differential area 515 is retrieved and returned. Note that if a block is overwritten with the same data, that an extent containing the block is not written to the differential area 515.

In order to backup a shadow copy, the mapping from the original volume physical blocks to differential area extents is preserved. One way to backup both the volume and any shadow copies persisted thereon is to do a physical backup of the volume. The term physical backup refers to copying physical blocks associated with a volume instead of performing an object-by-object backup. Note that blocks in empty extents may or may not be copied in a physical backup. A backup application may save a bitmap or other indication of which extents were empty and which were not empty in a dataset created by the backup. It will be recognized that not copying the empty extents will generally cause the dataset created by the physical backup to be smaller.

While various aspects of the invention have been described in conjunction with copy-on-write shadow copy techniques, other shadow copy techniques may also be used without departing from the spirit or scope of the invention.

Figure 6:
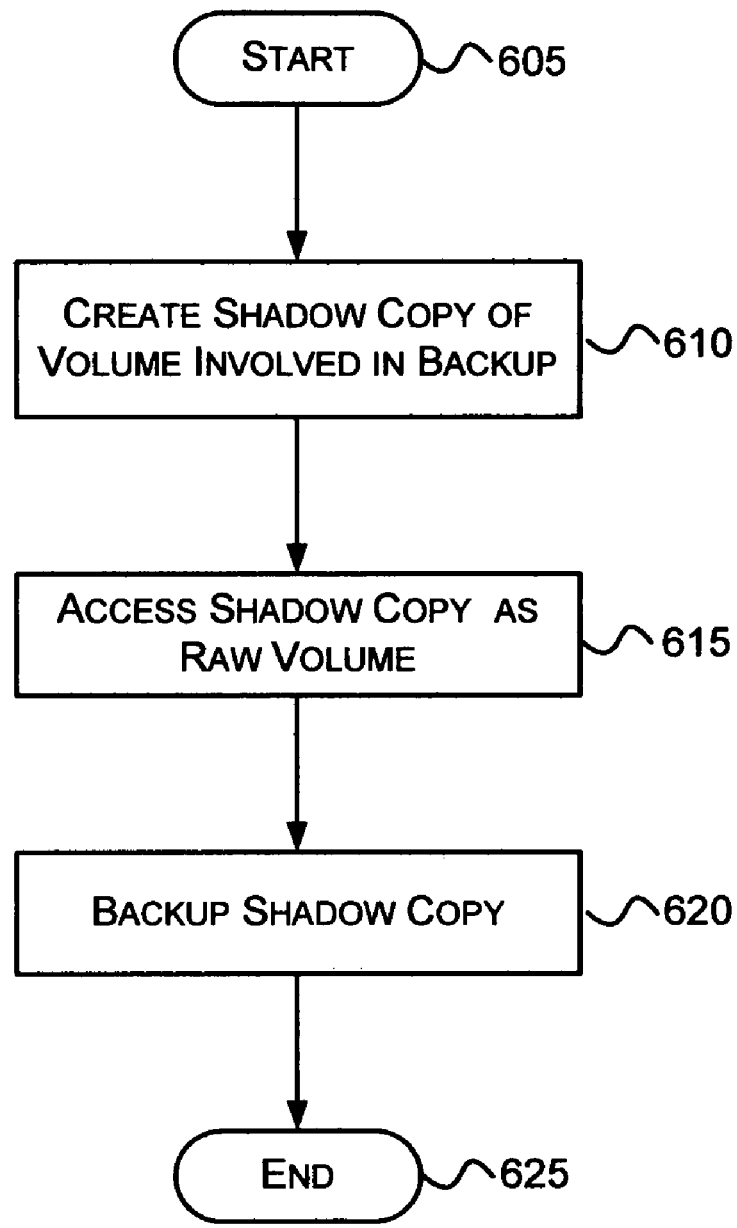
FIG. 6 is a flow diagram that generally represents actions that may occur to perform a physical backup in accordance with various aspects of the invention.

FIG. 6 is a flow diagram that generally represents actions that may occur to perform a physical backup in accordance with various aspects of the invention. Whenever the differential areas used for persisted shadow copies are collocated with the original volume, performing a physical backup will preserve the shadow copies as well as the volume. In this case, a backup may be taken as follows:

At block 605, the process is started. At block 610, a backup shadow copy of the volume involved in the backup is created. The backup shadow copy may be deleted as soon as the backup completes. Note that creating the backup shadow copy (instead of attempting to copy blocks from the volume directly) may be done to obtain a consistent and stable image of the volume.

At block 615, the shadow copy is opened as a raw volume, i.e., as a file representing the physical blocks underlying the shadow copy.

At block 620, the shadow copy is backed up in block order.

Whenever the differential areas used for persisted shadow copies are not collocated with the original volume, both the volume containing the differential areas and the original volume are backed up together. This may be done by taking shadow copies of both volumes at the same time and then accessing the shadow copies to create a dataset. An exemplary method and system for taking such shadow copies is described in U.S. Pat. No. 6,647,473, which is assigned to the assignee of the present invention, and hereby incorporated by reference.

A physical backup has some important attributes:

- The backup will mostly be done as a spiral read off the disk. There may be some random access for blocks that change after the shadow copy is created at block 610 above, but in general, the backup will be substantially faster than would be possible doing a normal full backup.
- The backup does not incur the previously discussed file handling overheads associated with obtaining objects and metadata associated therewith. Thus, the backup may use significantly less processing of the computer that is being backed up.
- When a dataset created by the physical backup is restored, then the restored volume will have the contents of the volume at the time that the shadow copy of the volume involved was performed (e.g., at block 610) and all persisted shadow copies that were on the volume at that time.

A dataset created by a physical backup may also be used for a fast recovery in conjunction with a normal backup rotation that includes differential and/or incremental backups. The dataset created by the physical backup may be treated as a full dataset and the dataset created by the differential or incremental backups may reference the dataset created by the physical backup. In this case, a subsequent incremental or differential dataset may be restored by first restoring the dataset created by the physical backup and then applying any subsequent differential and incremental datasets.

In addition, optional shadow copies may be created after applying each differential or incremental dataset. Creating these optional shadow copies may allow for quick reverting to a disk state represented by any of the shadow copies so that a volume may be restored to a state having as much good data as was available on the volume just prior to a disastrous loss or corruption of the volume.

Also note that when a full dataset is created by a physical full backup, the restore speed may be substantially faster than restoring a dataset created through a non-physical backup as the restore may be accomplished through a spiral write of blocks instead of object-by-object.

Differential Compression of Full Datasets

Typically, a data source does not change substantially from week to week. Furthermore, there are certain types of data sources where it is expected that very little change will occur. These data sources include:

- Data sources associated with operating system (OS) which include the OS binaries and system services persistent state.
- Data sources that include mostly read only databases or file stores such as those used for group scheduling and document management systems in which an appointment, contacts, and document management database is backed up. These data sources change as documents are modified or certain objects (e.g., contacts, calendar, and schedule) change.

Since the cost of maintaining a full dataset online is relatively expensive (i.e., on the order of the size of the volume that is backed up), being able to compress full datasets to take advantage of their slowly changing nature is advantageous and may allow many more full datasets to be maintained online using the same amount of storage.

Two techniques may be used for doing differential compression in backups:

- Use shadow copy technology to do the compression as described in more detail below. This technique works very well for datasets where content changes on the blocks that generally remain in the same place and do not move around positionally.
- Use a differential compression algorithm that is able to determine differences in datasets where the same data may appear in different positions at different times. Exemplary differential compression algorithms are described in U.S. patent application Ser. Nos. 10/825,753 and 10/844,893, which are both assigned to the assignee of the present invention, and hereby incorporated by reference.

With shadow copy technology, in one embodiment, a new full backup may be performed as follows:

1. Create a persistent shadow copy of the volume containing the dataset.
2. Overwrite the original dataset on the original volume with a new full dataset or new synthetic full dataset as described in conjunction with FIGS. 2-4.
3. Rename the original dataset to the new dataset.

In another embodiment, a new full backup may be performed as follows:

1. Create a persistent shadow copy of the volume containing the dataset.
2. Create a new full dataset or new synthetic full dataset as described in conjunction with FIGS. 2-4 on a volume other than the volume containing the original volume.
3. Overwrite the original dataset with the new dataset.
4. Rename the original dataset to the new dataset.
5. Delete the new dataset on the other volume.

When the original dataset is overwritten with the new dataset, the shadow copy technology described above places extents containing blocks that have changed in content (between the original and new datasets) into the differences area. Changing the name from the original dataset name to the new dataset name causes extents containing blocks with metadata regarding the original dataset to change and be placed in the differences area. This allows a program to access either the new dataset or the original dataset (via the shadow copy). It will be recognized that by using the technique described above, that the additional disk space needed for a new full dataset may simply comprise extents changed between the last full dataset and the new full dataset.

A new backup may be performed using remote differential compression as follows:

1. Create a new synthetic full dataset as described in conjunction with FIGS. 2-4.
2. Apply one of the exemplary remote compression algorithms described above to the original full dataset and the synthetic full dataset created in step 1 to create a differentially compressed dataset.
3. Delete the new dataset and rename the differential compression file to the new dataset name.

After the differentially compressed dataset is created using remote differential compression, a full dataset may be obtained by applying the differential compressed file to the previous full dataset.

Delta Computation for Backup of Large Data Files

A differential or incremental backup may be performed by examining each object on a storage device to see if the object has changed since the previous backup upon which the differential or incremental backup is based. Determining whether an object has changed may be performed, for example, by looking at the last modify time of the object. If it is determined that the object has changed, then the entire object may be copied to the dataset. Copying an entire object into a incremental or differential dataset each time any portion of the object changes may consume significant resources for large objects such as databases and e-mail stores which change frequently but where only a small portion of the object is actually changed.

In one embodiment of the invention, the extents in an object that have actually changed since a last backup are tracked so that they may be backed up when an incremental or differential backup is performed. Tracking these extents may be accomplished with a file system filter that keeps track of changes to large files (e.g., any files larger than 16 MB) on the volumes of a computer. The size of files tracked by the file system filter may be pre-configured or selected.

A file system filter may maintain the following information in a persistent store associated with a volume:

The path to the object that has been changed.
The set of extents in the object that have changed.

In one embodiment of the invention, the file system filter tracks the set of blocks that have changed in the object rather than the set of extents that have.

Figure 7:
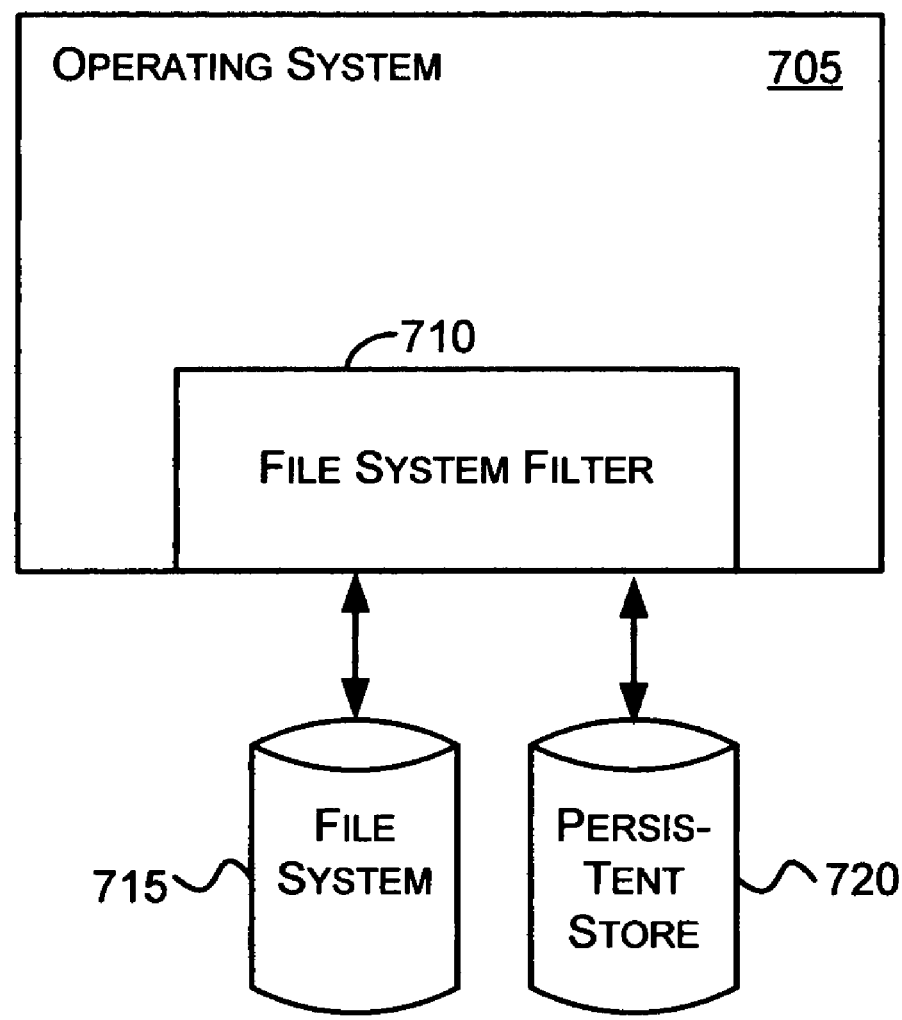
FIG. 7 is a block diagram showing an exemplary system in which changed extents may be tracked in accordance with various aspects of the invention.

FIG. 7 is a block diagram showing an exemplary system in which changed extents may be tracked in accordance with various aspects of the invention. An operating system 705 may receive requests to write to a file system 715. Such requests are passed through a file system filter 710. If the file system filter 710 determines that any changes to extents of a file should be tracked, it stores which extents have changed in a persistent store 720.

With an incremental backup scheme, the persistent store that tracks the extents may be reset each time an incremental or full backup is performed so that changes from each previous backup are tracked. If a differential backup scheme is used, the persistent store that tracks the extents may be reset each time a new full backup is performed.

A differential or incremental backup may use the persistent store as follows. If a reference to an object appears in the persistent store, then the differential or incremental backup may simply back up:

The list of extents in that object that have changed; and
The contents of those extents in the same order that they appear in the list.

To reconstruct an object from a set of incremental datasets and a full dataset or from a differential dataset and a full dataset, the following actions may be performed:

1. For each extent in the object, find the most recent dataset that has that extent in its list of extents that have changed or has a full dataset of the object; and
2. Copy that extent from that dataset and continue at the next extent.

In one embodiment of the invention, two lists of extents may be maintained to support a full, differential, and incremental backup scheme. The file system filter tracks whether each candidate object (e.g., of sufficient size or other criteria) has changed in the two lists by:

Maintaining a list of extents that have changed in those objects since the last full backup was performed; and
Maintaining a list of extents that have changed in those objects since the last differential or incremental backup was performed.

A differential dataset may be created using the first list of extents while an incremental dataset may be created using the second list of extents. The second list may be reset whenever an incremental or differential backup is performed. The first list may be reset when a full backup is performed.

Reading Data Directly from a Dataset

Many applications (e.g., e-mail, document management, active directory, and the like) store objects in a database. It is often desirable to restore particular sets of objects from the database rather than restoring the entire database. This is often the case when recovering from a user error such as when a user accidentally deletes documents or email messages that the user did not intend to delete. For example, it is very common to restore mailboxes from e-mail databases and individual documents from a document management system.

Typically, these kinds of objects may be restored by allocating space for the entire database, restoring the entire database to the point in time that the objects to be restored are at the desired state (e.g., not deleted or changed), and then using an application (e.g., an e-mail system, document management system, or other suitable application) to mount the database and extract the desired objects.

By keeping a dataset on a disk there may be no need to restore the dataset to a disk before accessing the desired objects via the appropriate application. Instead, the application may access the files directly as stored in the dataset. If a dataset created by a physical backup is stored as a copy of a volume (as opposed to in MTF format), the dataset may be mounted directly as a volume after removing any header or trailer in the dataset.

If the dataset is stored in an MTF format (or some other archive format), a file system filter may perform the following actions:

Expose the dataset as a volume and allow access to the volume. Give the volume a different name or allow access through a location different from the location of the original volume in a local computer name space;

Perform a lookup to locate the appropriate database file contained in the dataset when an application attempts to open the database file via the exposed volume. Note that as the dataset appears as a volume (e.g., through the use of the file system filter), each file and directory in the volume (and hence the dataset) may be opened directly;

Allow metadata to be directly read from the volume and allow object data to be read using the normal file system I/O primitives; and Preserve the read-only nature of the dataset by performing copy-on-writes in a separate location when an application attempts to write data to the volume. This may be useful to support an application that does not support a read-only mount, such as an e-mail server or client.

The file system filter may utilize an online catalog associated with the dataset that maps each object in the dataset to a corresponding offset in the created volume. This catalog may be created for datasets that do not store a catalog therein. For example, when opening an object in the volume, the online catalog may be searched for that object and the offset into the dataset found.

Headers at the offset may be used to extract metadata for the object and to create a mapping between the offsets to the object and offsets into the data for the object. Any read operations on the object may result in a corresponding read operation on the dataset at the computed offset based on this mapping.

For datasets stored in MTF or non-MTF format, if a dataset is created by an incremental or differential backup, then a file system filter may treat the dataset and any other datasets it is based on as a unit. To obtain information related to an object, the unit of datasets may be searched to find the most recent dataset containing the information. Prior to allowing access to the volume based on the group of datasets created by backups, an online catalog may be created to map objects to their corresponding locations within the datasets.

As can be seen from the foregoing detailed description, there is provided an improved method and system for creating, restoring, and using datasets associated with backups. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing system, a method for creating a synthetic full backup of a file system, the method comprising:
    performing a normal full backup of a file system, the file system including data, wherein the normal full backup uses the file system to create a normal full backup dataset at create time and store the normal full backup dataset on one or more computer storage media, and wherein the normal full backup dataset is a first full backup;
    subsequent to performing the normal full backup, performing a partial backup of the file system to create a second backup dataset and store it on one or more computer storage media after changes to the file system, such that the first full backup is out of date, the second backup dataset including only a portion of the data of the file system, including portions of the file system changed since the normal full backup, wherein performing the partial backup of the file system to create the second backup dataset comprises differentiating whether to perform a full or partial backup of all files within the file system based on file size, wherein differentiating comprises:
    for all files within the file system, determining whether the files exceed a predetermined size, and:
    for all files determined to have a size exceeding the predetermined size, copying only changed extents within such files, such that only changes within a file, rather than an entire file, are included in the second backup dataset of the partial backup of the file system; and
    for all files determined to have a size less than the predetermined size, copying the entire contents of such files, such that the entire files, rather than merely changes to files, are included in the second backup dataset of the partial backup of the file system;
    performing a synthetic backup operation by merging the first full backup of the normal full backup with the second backup dataset to create a first synthetic full dataset of the file system and to store the first synthetic full dataset on one or more computer storage media, wherein the first synthetic full dataset is equivalent of what a normal full backup would have created if executed at create time of the first synthetic full dataset, and wherein a synthetic backup creates a full dataset based on prior backups rather than the file system; and
    periodically performing an additional synthetic backup operation to create a second synthetic full dataset of the file system and any changes thereto, and to store the second synthetic full data set on one or more computer storage media, and such that the first full backup is the only normal backup performed to create a full dataset.

2. The method of claim 1, wherein performing the normal full backup comprises copying the data onto online storage.

3. The method of claim 2, wherein the data comprises objects that are each associated with metadata and wherein the data is copied onto online storage by obtaining metadata associated with each object and copying the object and its associated metadata to the online storage.

4. The method of claim 2, wherein the file system comprises a volume and wherein copying the data onto the online storage comprises creating a shadow copy of a volume and copying the shadow copy onto the online storage.

5. The method of claim 4, wherein the shadow copy is maintained on the volume.

6. The method of claim 4, wherein the shadow copy is maintained on the volume and another volume.

7. The method of claim 1, wherein the online storage comprises a hard disk.

8. The method of claim 1, wherein the file system comprises a volume that includes a shadow copy and wherein data associated with the shadow copy is preserved during each backup.

9. The method of claim 8, wherein the data associated with the shadow copy is preserved by copying physical blocks of the volume in performing each backup.

10. The method of claim 8, further comprising restoring the second backup dataset and the data associated with the shadow copy preserved therein, such that the shadow copy is accessible normally.

11. The method of claim 1, wherein the data is stored in storage divided into blocks and wherein the first full backup and the partial backup are performed through a physical backup of the storage.

12. The method of claim 11, wherein the physical backup is performed by opening a file comprised of all blocks to be backed up and copying the blocks to be backed up.

13. The method of claim 11, further comprising restoring the first full backup through a physical restore comprising opening the first full backup as a file and sequentially copying blocks in the first full backup to a restore storage.

14. The method of claim 13, further comprising applying the portion of the data of the file system included in the second backup dataset to the restore storage.

15. The method of claim 1, wherein the data comprises blocks and wherein performing the partial backup comprises compressing the portion of the data.

16. The method of claim 15, wherein compressing the portion of the data comprises placing any blocks that have changed in the data into a differences area.

17. The method of claim 16, wherein the blocks that have changed in the data are placed into the differences area through the operation of a shadow copy mechanism.

18. The method of claim 17, wherein multiple full datasets are represented on a storage device as multiple shadow copies created by the shadow copy mechanism.

19. The method of claim 15 wherein compressing the portion of the data comprises applying a differential compression algorithm.

20. The method of claim 1, wherein performing the partial backup of the file system to create a second backup dataset comprises copying other objects that have changed but are not tracked by copying all blocks associated with the other objects into the second backup dataset.

21. The method of claim 1, wherein the data is a tape format dataset.

22. The method of claim 1, wherein performing a partial backup of the file system to create the second backup dataset comprises, when it is determined a block on a disk is to be changed, copying an extent containing the block to a storage location in a differential area, before changing the block on the disk.

23. The method of claim 1, wherein performing the partial backup of the file system to create the second backup dataset comprises:
- resetting a persistent store of a filter each time a partial backup of the file system is performed;
- determining a file size of each file in the file system;
- for each file in the file system that has a size less than the predetermined size, using a respective last modify time to determine whether the object has changed;
- for each file having a size less than the predetermined size and that that has changed, copying the entire object into the second backup dataset;
- for each file in the file system that has a size exceeding the predetermined size, tracking extents within the file using a filter that stores, in persistent storage:
  - a path to a file that has been changed;
  - a list of a set of extents in the file that have changed; and
  - contents of those extents in the set of extents in the same order they appear in the list of the set of extents.

24. One or more computer storage media for use in a computing environment, the computer-readable storage media having stored thereon computer executable instructions that, when executed by a computing device, cause the computing device to perform a method for creating a synthetic full backup of a file system of the computing environment, the method executed by the computing device comprising:
- performing a normal full backup of a file system, the file system including data, wherein the normal full backup uses the file system to create a normal full backup dataset at create time and store the normal full backup dataset on one or more computer storage media, and wherein the normal full backup dataset is a first full backup;
- subsequent to performing the normal full backup, performing a partial backup of the file system to create a second backup dataset and store it on one or more computer storage media after changes to the file system, such that the first full backup is out of date, the second backup dataset including only a portion of the data of the file system, including portions of the file system changed since the normal full backup, wherein performing the partial backup of the file system to create the second backup dataset comprises differentiating whether to perform a full or partial backup of all files within the file system based on file size, wherein differentiating comprises:
- for all files within the file system, determining whether the files exceed a predetermined size, and:
- for all files determined to have a size exceeding the predetermined size, copying only changed extents within such files, such that only changes within a file, rather than an entire file, are included in the second backup dataset of the partial backup of the file system; and
- for all files determined to have a size less than the predetermined size, copying the entire contents of such files, such that the entire files, rather than merely changes to files, are included in the second backup dataset of the partial backup of the file system;
- performing a synthetic backup operation by merging the first full backup of the normal full backup with the second backup dataset to create a first synthetic full dataset of the file system and to store the first synthetic full dataset on one or more computer storage media, wherein the first synthetic full dataset is equivalent of what a normal full backup would have created if executed at create time of the first synthetic full dataset, and wherein a synthetic backup creates a full dataset based on prior backups rather than the file system; and
- periodically performing an additional synthetic backup operation to create a second synthetic full dataset of the file system and any changes thereto, and to store the second synthetic full data set on one or more computer storage media, and such that the first full backup is the only normal backup performed to create a full dataset.

* * * * *